United States Patent
Baker et al.

(10) Patent No.: US 9,461,696 B1
(45) Date of Patent: Oct. 4, 2016

(54) METHOD AND CONVERGED COMMUNICATION DEVICE FOR ENHANCING BROADBAND AND NARROWBAND COMMUNICATION

(71) Applicant: MOTOROLA SOLUTIONS, INC., Schaumburg, IL (US)

(72) Inventors: Michael H. Baker, Elmhurst, IL (US); Brundaban Sahoo, Lake Zurich, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/875,406

(22) Filed: Oct. 5, 2015

(51) Int. Cl.
*H04B 1/38* (2015.01)
*H04B 1/401* (2015.01)
*H04B 17/336* (2015.01)
*H04W 88/06* (2009.01)
*H04B 1/00* (2006.01)

(52) U.S. Cl.
CPC ............ *H04B 1/401* (2013.01); *H04B 1/006* (2013.01); *H04B 17/336* (2015.01); *H04W 88/06* (2013.01)

(58) Field of Classification Search
CPC ...... H04B 1/38; H04B 1/3805; H04B 1/401; H04B 17/336; H04B 1/006; H04W 88/06; H04W 72/085; H04W 72/08; H04W 72/10
See application file for complete search history.

(56) References Cited

U.S. PATENT DOCUMENTS 8,576,901 B2 11/2013 Tat et al.
8,655,304 B2 2/2014 Makhlouf et al.
(Continued)

FOREIGN PATENT DOCUMENTS

WO 2011063019 5/2011

OTHER PUBLICATIONS

Sahoo et al., "Apparatus and Method for Carrier Aggregation and Fast Network Switching with a Single-Baseband-Modem, Carrier-Aggregation-Capable Wireless-Communication Device," U.S. Appl. No. 14/587,035, filed Dec. 31, 2014 by Motorola Solutions, Inc. (50 pages).
(Continued)

*Primary Examiner* — Khanh C Tran
(74) *Attorney, Agent, or Firm* — Michael Best & Friedrich LLP

(57) ABSTRACT

A converged communication device and a method of providing broadband communication and narrowband communication with the converged communication device. The method includes determining a data rate at a broadband transceiver of the converged communication device. The method also includes determining a signal-to-interference-plus-noise ratio at a narrowband transceiver of the converged communication device. The method further includes assigning a first communication state to the converged communication device when the data rate is greater than a threshold data rate and the signal-to-interference-plus-noise ratio is greater than a threshold signal-to-interference-plus-noise ratio. The method also includes transmitting, at the broadband transceiver, the broadband communication when the converged communication device is in the first communication state. The method further includes transmitting, at the narrowband transceiver, the narrowband communication when the converged communication device is in the first communication state.

20 Claims, 12 Drawing Sheets

(56) References Cited

U.S. PATENT DOCUMENTS

| | | | |
|---|---|---|---|
| 8,780,712 B2* | 7/2014 | Tsai | H04W 4/008 370/230 |
| 8,897,344 B2* | 11/2014 | Maguire | H04B 1/38 375/219 |
| 2006/0188003 A1 | 8/2006 | Larsson | |
| 2011/0130092 A1* | 6/2011 | Yun | H04W 72/085 455/39 |
| 2012/0172083 A1 | 7/2012 | Logalbo et al. | |
| 2012/0307875 A1* | 12/2012 | Maguire | H04B 1/38 375/219 |
| 2013/0010718 A1 | 1/2013 | Horn | |
| 2014/0064193 A1 | 3/2014 | Yacobi et al. | |
| 2014/0133530 A1* | 5/2014 | Maguire | H04B 1/38 375/219 |
| 2014/0177457 A1 | 6/2014 | Grosspietsch et al. | |

OTHER PUBLICATIONS

Sahoo et al., "Methods and Systems for Flexible Fast Network Switching," U.S. Appl. No. 14/517,168, filed Oct. 17, 2014 by Motorola Solutions, Inc. (52 pages).

* cited by examiner

METHOD AND CONVERGED COMMUNICATION DEVICE FOR ENHANCING BROADBAND AND NARROWBAND COMMUNICATION

BACKGROUND OF THE INVENTION

A converged communication device incorporates components (for example, hardware and software) to permit communications via two or more modalities. For example, a converged communication device may incorporate components to support communications via a narrowband network (for example, a land mobile radio (LMR) network) and a broadband network (for example, a commercial long term evolution (LTE) network). Conditions such as radio-frequency interference can adversely affect the operation of converged communication devices. Typically, either narrowband communication or broadband communication is interrupted when radio-frequency interference is encountered.

Numerous mission critical applications (for example, applications that support the activities of public safety agencies) can operate with both narrowband and broadband communication. However, these mission critical applications generally include a mission critical data-throughput requirement.

Accordingly, there is a need for enhancing simultaneous broadband and narrowband communication with a converged communication device when interference or other adverse conditions are present.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
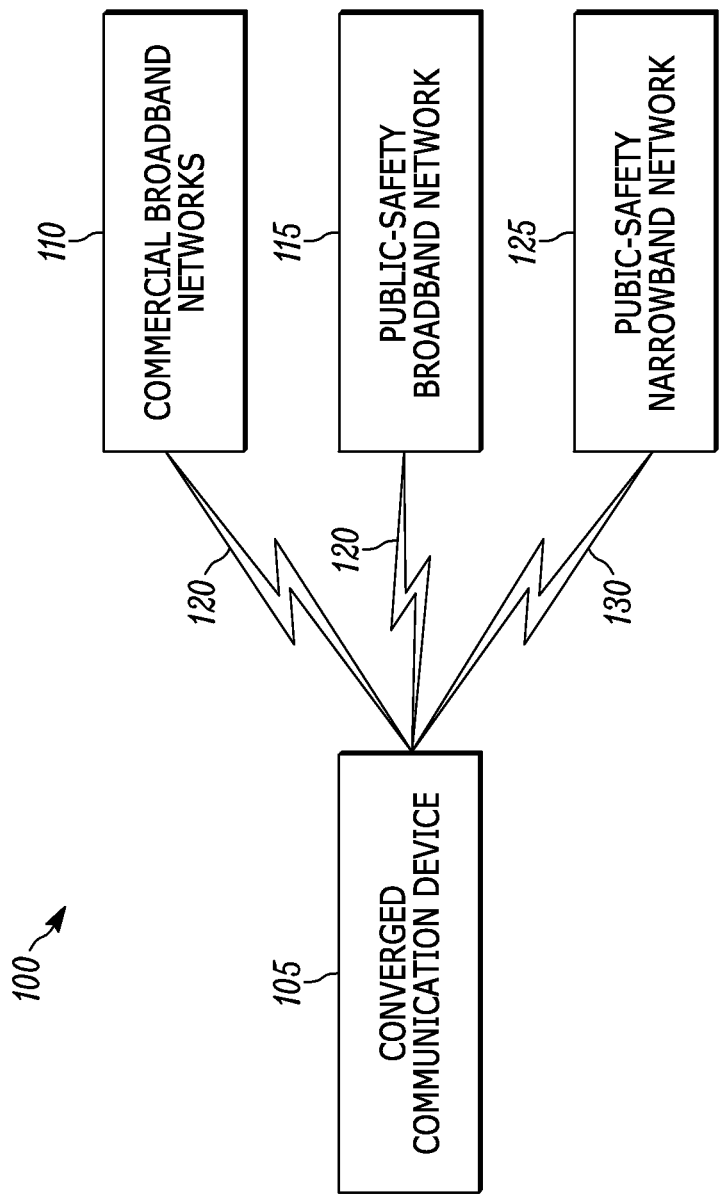
FIG. 1 is block diagram of communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some exemplary embodiments include a method of providing broadband communication and narrowband communication with a converged communication device. In some embodiments, the method includes determining a data rate at a broadband transceiver of the converged communication device. The method also includes determining a signal-to-interference-plus-noise ratio at a narrowband transceiver of the converged communication device. The method further includes assigning a first communication state to the converged communication device when the data rate is greater than a threshold data rate and the signal-to-interference-plus-noise ratio is greater than a threshold signal-to-interference-plus-noise ratio. The method also includes transmitting, at the broadband transceiver, the broadband communication when the converged communication device is in the first communication state. The method further includes transmitting, at the narrowband transceiver, the narrowband communication when the converged communication device is in the first communication state.

Other exemplary embodiments include a converged communication device for providing broadband communication and narrowband communication. In some embodiments, the converged communication device includes a broadband transceiver, a narrowband transceiver, and at least an electronic processor. The broadband transceiver transmits the broadband communication when the converged communication device is in a first communication state. The narrowband transceiver transmits the narrowband communication when the converged communication device is in the first communication state. The electronic processor is programmed to determine a data rate at the broadband transceiver and determine a signal-to-interference-plus-noise ratio at the narrowband transceiver. The electronic processor is also programmed to assign the first communication state to the converged communication device when the data rate is greater than a threshold data rate and the signal-to-interference-plus-noise ratio is greater than a threshold signal-to-interference-plus-noise ratio.

FIG. 1 illustrates a communication system 100. In some embodiments, the communication system 100 includes, among other components, a converged communication device 105, one or more commercial broadband networks 110, a public-safety broadband network 115, one or more broadband communication links 120, a public-safety narrowband network 125, and one or more narrowband communication links 130. In some embodiments, each of the commercial broadband networks 110 and the public-safety broadband network 115 operate according to a Long Term Evolution (LTE) protocol including, but not limited to, 3$^{rd}$ Generation Partnership Project (3GPP). In some embodiments, the public-safety narrowband network 125 operates according to a Land Mobile Radio (LMR) specification or protocol including, but not limited to, Project 25 (P25), ASTRO 25, Terrestrial Trunked Radio (TETRA), and Digital Mobile Radio (DMR). Although two broadband networks and one narrowband network are illustrated in FIG. 1, in practice, the communication system 100 can have any quantities of broadband and narrowband networks. Further, the communication system 100 can include any types of broadband and narrowband networks.

In general, in at least one embodiment, each of the commercial broadband networks 110, the public-safety broadband network 115, and the public-safety narrowband network 125 includes typical network components such as base stations, base station controllers, routers, switches, and the like, arranged, connected, and programmed to provide wireless service to user equipment (for example, the converged communication device 105) in a manner known to those of skill in the relevant art.

Figure 2:
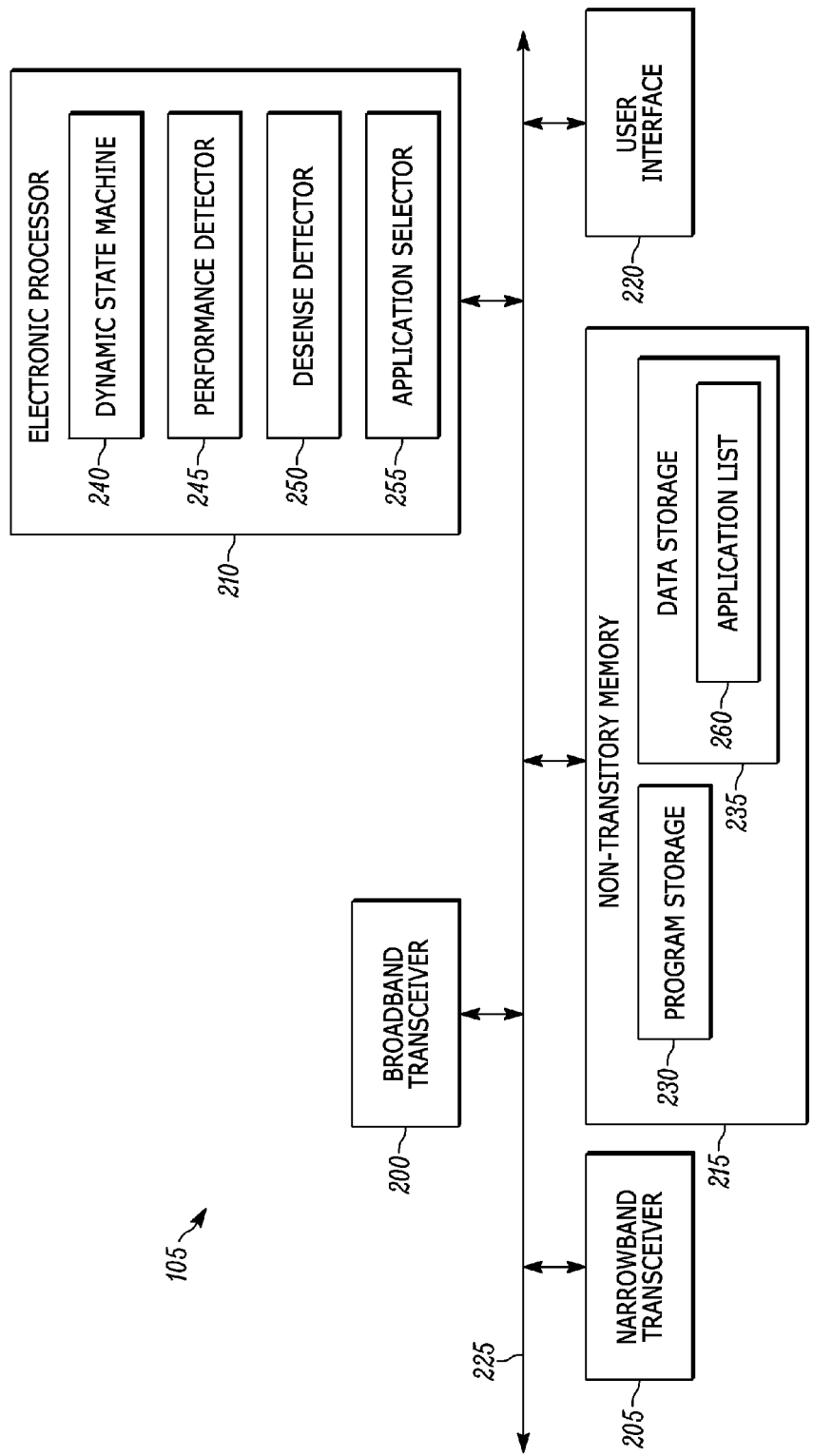
FIG. 2 is a block diagram of a converged communication device, in accordance with some embodiments.

FIG. 2 illustrates a converged communication device 105, according to some embodiments. The converged communication device 105 illustrated in FIG. 2 includes, among other components, a broadband transceiver 200, a narrowband transceiver 205, an electronic processor 210 (for example, a microprocessor, a microcontroller, or another suitable programmable device), a non-transitory memory 215, and a user interface 220. The broadband transceiver 200, the narrowband transceiver 205, the electronic processor 210, the non-transitory memory 215, and the user interface 220 are communicably coupled with one another via a system bus 225.

The broadband transceiver 200 transmits broadband communication to the commercial broadband networks 110 and the public-safety broadband network 115 via the broadband communication links 120. The broadband transceiver 200 also receives broadband communication from the commercial broadband networks 110 and the public-safety broadband network 115 via the broadband communication links 120. The narrowband transceiver 205 transmits narrowband communication to the public-safety narrowband network 125 via the narrowband communication links 130. The narrowband transceiver 205 also receives narrowband communication from public-safety narrowband network 125 via the narrowband communication links 130.

In some embodiments, the electronic processor 210 includes one or more processors, which may include, for example, a general-purpose microprocessor and a dedicated digital signal processor (DSP).

The non-transitory memory 215 includes, for example, a program storage 230 and a data storage 235. The program storage 230 and the data storage 235 can include combinations of different types of memory, such as read only memory (ROM), random access memory (RAM) (for example, dynamic RAM [DRAM], synchronous DRAM [SDRAM], etc.), electrically erasable programmable read-only memory (EEPROM), flash memory, a hard disk, an SD card, or other suitable magnetic, optical, physical, or electronic memory devices or data structures. The electronic processor 210 is connected to the non-transitory memory 215 and executes software instructions that are capable of being stored in a RAM of the non-transitory memory 215 (for example, during execution), a ROM of the non-transitory memory 215 (for example, on a generally permanent basis), or another non-transitory computer readable medium such as another memory or a disc. Software included in some embodiments of the converged communication device 105 can be stored in the non-transitory memory 215. The software includes, for example, firmware, one or more applications, program data, filters, rules, one or more program modules, and other executable instructions. The electronic processor 210 is configured to retrieve from the non-transitory memory 215 and execute, among other things, instructions related to the control processes and methods described herein.

The user interface 220 is used to control or monitor the converged communication device 105 and/or the communication system 100. The user interface 220 can include a combination of digital and analog input or output devices required to achieve a desired level of control and monitoring for the converged communication device 105. For example, the user interface 220 can include a display and input devices such as a touch-screen display, one or more knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc. In other constructions, the display is a Super active-matrix OLED ("AMOLED") display. The user interface 220 can also be configured to display conditions or data associated with applications that are executed on the converged communication device 105 in real-time or substantially real-time.

The electronic processor 210 operates a plurality of mission critical applications that make use of the broadband communication links 120 and/or the narrowband communication links 130. Mission critical applications may include, but are not limited to, voice over LTE (VoLTE), video over LTE (ViLTE), Short Message Service (SMS), Global Positioning System (GPS), capturing of video using a personnel-mounted (for example, officer-mounted) video camera, push-to-talk (PTT) communications, tunneled PTT communications (a.k.a. backup PTT) (for example, if a given communication device leaves land mobile radio range, and then communicates via a pipe (for example, an LTE pipe) over a broadband connection in order to continue mission-critical PTT communication), remote location tracking, and real-time location reporting (during, for example, in-building operations).

The electronic processor 210 includes a dynamic state machine 240, a performance detector 245, and a desense detector 250. The broadband communication links 120 must maintain minimum performance levels to execute mission critical applications. The narrowband communication links 130 also must maintain minimum performance levels to execute mission critical applications. The performance detector 245 and the desense detector 250 generate information regarding the status of the broadband communication links 120 and the narrowband communication link 130. The dynamic state machine 240 determines when the converged communication device 105 transmits mission critical broadband communication and mission critical narrowband communication. The dynamic state machine 240 makes this determination based, in part, on the information it receives from the performance detector 245 and the desense detector 250.

The electronic processor 210 also includes an application selector 255. The application selector 255 selects mission critical applications to execute based on the available mission critical communication paths, as determined by the dynamic state machine 240. In some embodiments, the application selector 255 selects mission critical application contained within an application list 260. In some embodiments, the data storage 235 includes the application list 260, as illustrated in FIG. 2.

As explained above, the broadband communication links 120 must maintain minimum performance levels to execute mission critical applications. The minimum performance levels include, but are not limited to, a data rate at the broadband transceiver 200. The data rate at the broadband transceiver 200 is the aggregate rate at which data passes through the broadband transceiver 200. Data rate is expressed, for example, in bits per second. The data rate includes a downlink data rate and an uplink data rate. In some embodiments, the data rate at the broadband transceiver 200 has to be greater than a threshold data rate (for example, 1 megabits per second) for the broadband communication links 120 to maintain mission critical status.

The performance detector 245 determines an average data rate by measuring the data rate at the broadband transceiver 200 over a set interval of time (for example, several seconds). The performance detector 245 compares the average data rate to a threshold data rate. The dynamic state machine 240 determines when the converged communication device 105 transmits mission critical broadband communication based, in part, on the result of the comparison. In some embodiments, the dynamic state machine 240 determines that the converged communication device 105 transmits mission critical broadband communication when the average data rate is greater than the threshold data rate. In some embodiments, the dynamic state machine 240 determines that converged communication device 105 does not transmit mission critical broadband communication when the average data rate is less than or equal to the threshold data rate.

Factors that can affect the data rate at the broadband transceiver 200 include, but are not limited to, the proximity of the converged communication device 105 to a base station of one of the commercial broadband networks 110, the proximity of the converged communication device 105 to a base station of the public-safety narrowband network 125, and the proximity of the converged communication device 105 to another communication device (for example, another converged communication device) that is communicating in an adjacent band.

Another factor that can affect the data rate at the broadband transceiver 200 is broadband desense. Narrowband communication (for example, transmitted by the narrowband transceiver 205) can cause interference which can lower the sensitivity of the broadband transceiver 200 (for example, desense the broadband transceiver 200). Broadband desense (for example, downlink broadband desense) occurs at the broadband transceiver 200 when the narrowband transceiver 205 is transmitting while the broadband transceiver 200 is active. Broadband desense of the broadband transceiver 200 is instantaneous and can cause the instantaneous data rate at the broadband transceiver 200 to drop below the threshold data rate. The desense detector 250 detects broadband desense of the broadband transceiver 200 that can be caused when the narrowband transceiver 205 is transmitting. In some embodiments, the desense detector 250 detects broadband desense of the broadband transceiver 200 based on changes in the downlink data rate at the broadband transceiver 200 before, during, and immediately after the narrowband transceiver 205 transmits narrowband communication. For example, the desense detector 250 detects broadband desense of the broadband transceiver 200 when a significant drop in the instantaneous downlink data rate at the broadband transceiver 200 occurs while the narrowband transceiver 205 is transmitting. In some embodiments, the desense detector 250 detects broadband desense of the broadband transceiver 200 based on monitored changes in received signal strength indicators, reference signal receive powers, reference signal received qualities, bit error rates, and power measurement in adjacent frequency bands before, during, and immediately after the narrowband transceiver 205 transmits narrowband communication.

Broadband desense (for example, uplink broadband desense) occurs at the commercial broadband networks 110 and the public-safety broadband network 115 when the converged communication device 105 is simultaneously transmitting broadband and narrowband communication. For example, broadband desense can occur in a base station of the public-safety broadband network 115 when the converged communication device 105 is simultaneously transmitting broadband and narrowband communication. In some embodiments, the desense detector 250 detects uplink broadband desense. In some embodiments, the desense detector 250 detects uplink broadband desense based on hybrid automatic repeat requests. For example, the desense detector 250 detects uplink broadband desense when a base station of the public-safety broadband network 115 requests a rebroadcast after the converged communication device 105 simultaneously transmits broadband and narrowband communication. In some embodiments, the desense detector 250 detects uplink broadband desense based on a signal received from either the commercial broadband networks 110 or the public-safety broadband network 115. For example, a base station of the public-safety broadband network 115 transmits a signal to the converged communication device 105 when the base station detects uplink broadband desense in its transceiver. In some embodiments, the converged communication device 105 transmits a signal to the base station of the public-safety broadband network 115 indicating that it is simultaneously transmitting broadband and narrowband communication.

In some embodiments, the dynamic state machine 240 determines when the converged communication device 105 transmits mission critical broadband communication based in part on the detected broadband desense (including, but not limited to, downlink broadband desense and uplink broadband desense). In some embodiments, the dynamic state machine 240 determines that converged communication device 105 does not transmit mission critical broadband communication when broadband desense is detected by the desense detector 250. Simultaneous transmission of narrowband communication from the narrowband transceiver 205 and reception of broadband communication at the broadband transceiver 200 does not always occur. In some embodiments, the desense detector 250 holds an indication of broadband desense until a new event with simultaneous transmission of narrowband communication from the narrowband transceiver 205 and reception of broadband communication at the broadband transceiver 200 occurs. In some embodiments, the desense detector 250 holds an indication of desense of the broadband transceiver 200 for a predetermined period of time (for example, one minute) before resetting to indicate no desense. In some embodiments, the desense detector 250 holds an indication of broadband desense until the converged communication device 105 changes location.

Also, as explained above, the narrowband communication link 130 must maintain minimum performance levels to execute mission critical applications. The minimum performance levels include, but are not limited to, signal-to-interference-plus noise ratio (SINR) at the narrowband transceiver 205. Signal-to-interference-plus-noise ratio (measured in decibels) is a quantity used to give theoretical upper bounds on channel capacity in wireless communication systems. Signal-to-interference-plus-noise ratio is defined as a power of a certain signal of interest divided by the sum of interference power (from all the other interfering signals) and the power of thermal noise. In some embodiments, the signal-to-interference-plus-noise ratio at the narrowband transceiver 205 has to be greater than a threshold signal-to-interference-plus-noise ratio (for example, 17.7 decibels) for the narrowband communication links 130 to maintain mission critical status.

The performance detector 245 determines an average signal-to-interference-plus-noise ratio by measuring the signal-to-interference-plus-noise ratio at the narrowband transceiver 205 over a set interval of time (for example, several seconds). The performance detector 245 compares the average signal-to-interference-plus-noise ratio to a threshold signal-to-interference-plus-noise ratio. The dynamic state machine 240 determines when the converged communication device 105 transmits mission critical narrowband communication based in part on the result of the comparison. In some embodiments, the dynamic state machine 240 determines that the converged communication device 105 transmits mission critical narrowband communication when the average signal-to-interference-plus-noise ratio is greater than the threshold signal-to-interference-plus-noise ratio. In some embodiments, the dynamic state machine 240 determines that the converged communication device 105 does not transmit mission critical narrowband communication when the average signal-to-interference-plus-noise ratio is less than or equal to the threshold signal-to-interference-plus-noise ratio.

Factors that can affect the signal-to-interference-plus-noise ratio at the narrowband transceiver 205 include, but are not limited to, the proximity of the converged communication device 105 to a base station of one of the commercial broadband networks 110, the proximity of the converged communication device 105 to a base station of the public-safety narrowband network 125, and the proximity of the converged communication device 105 to another communication device (for example, another converged communication device) that is communicating in an adjacent band.

Another factor that can affect the signal-to-interference-plus-noise ratio is narrowband desense. Broadband communication (for example, transmitted by the broadband transceiver 200) can cause interference which can lower the sensitivity of the narrowband transceiver 205 (for example, desense the narrowband transceiver 205). Narrowband desense (for example, downlink narrowband desense) occurs at the narrowband transceiver 205 when the broadband transceiver 200 is transmitting while the narrowband transceiver 205 is active. Narrowband desense of the narrowband transceiver 205 is instantaneous and can cause the instantaneous signal-to-interference-plus-noise ratio at the narrowband transceiver 205 to drop below the threshold signal-to-interference-plus-noise ratio. The desense detector 250 detects narrowband desense of the narrowband transceiver 205 that can be caused when the broadband transceiver 200 is transmitting. In some embodiments, the desense detector 250 detects narrowband desense of the narrowband transceiver 205 based on changes in the signal-to-interference-plus-noise ratio at the narrowband receiver 205 before, during, and immediately after the broadband transceiver 200 transmits broadband communication. For example, the desense detector 250 detects narrowband desense of the narrowband transceiver 205 when a significant drop in the signal-to-interference-plus-noise ratio at the narrowband receiver 205 occurs while the broadband transceiver 200 is transmitting. In some embodiments, the desense detector 250 detects narrowband desense of the narrowband transceiver 205 based on monitored changes in received signal strength indicators, reference signal receive powers, reference signal received qualities, bit error rates, and power measurement in adjacent frequency bands before, during, and immediately after the broadband transceiver 200 transmits broadband communication.

Narrowband desense (for example, uplink narrowband desense) occurs at the public-safety narrowband network 125 when the converged communication device 105 is simultaneously transmitting broadband and narrowband communication. For example, narrowband desense can occur in a base station of the public-safety narrowband network 125 when the converged communication device 105 is simultaneously transmitting broadband and narrowband communication. In some embodiments, the desense detector 250 detects uplink narrowband desense. In some embodiments, the desense detector 250 detects uplink narrowband desense based on hybrid automatic repeat requests. For example, the desense detector 250 detects uplink narrowband desense when a base station of the public-safety narrowband network 125 requests a rebroadcast after the converged communication device 105 simultaneously transmits broadband and narrowband communication. In some embodiments, the desense detector 250 detects uplink narrowband desense based on a signal received from the public-safety narrowband network 125. For example, a base station of the public-safety narrowband network 125 transmits a signal to the converged communication device 105 when the base station detects uplink narrowband desense in its transceiver. In some embodiments, the converged communication device 105 transmits a signal to the base station of the public-safety narrowband network 125 indicating that it is simultaneously transmitting broadband and narrowband communication.

In some embodiments, the dynamic state machine 240 determines when the converged communication device 105 transmits mission critical narrowband communication based in part on the detected narrowband desense (including, but not limited to, downlink narrowband desense and uplink narrowband desense). In some embodiments, the dynamic state machine 240 determines that converged communication device 105 transmits mission critical narrowband communication when narrowband desense is detected by the desense detector 250. Simultaneous transmission of broadband communication from the broadband transceiver 200 and reception of narrowband communication at the narrowband transceiver 205 does not always occur. In some embodiments, the desense detector 250 holds an indication of narrowband desense until a new event with simultaneous transmission of broadband communication from the broadband transceiver 200 and reception of narrowband communication at the narrowband transceiver 205 occurs. In some embodiments, the desense detection 250 holds an indication of narrowband desense for a predetermined period of time (for example, one minute) before resetting to indicate no desense. In some embodiments, the desense detection 250 holds an indication of narrowband desense until the converged communication device 105 changes location.

It is generally preferable for the converged communication device 105 to transmit mission critical broadband communication and mission critical narrowband communication simultaneously. However, in some instances, operating conditions do not allow this. As such, the dynamic state machine 240 identifies when the converged communication device 105 transmits mission critical broadband communication and mission critical narrowband communication.

The electronic processor 210 generates a preferred communication mode by assigning a preference to either broadband communication or narrowband communication. The electronic processor 210 further performs corrective actions to ensure that the communication links of the preferred communication mode maintain mission critical status. In some embodiments, the electronic processor 210 assigns this preference based on a set of input data received via the user interface 220. In other embodiments, the electronic processor 210 assigns this preference based on data stored in non-transitory memory 215. In other embodiments, the electronic processor 210 assigns this preference based on a broadband communication received via the broadband transceiver 200 or a narrowband communication received via the narrowband transceiver 205.

Figure 3:
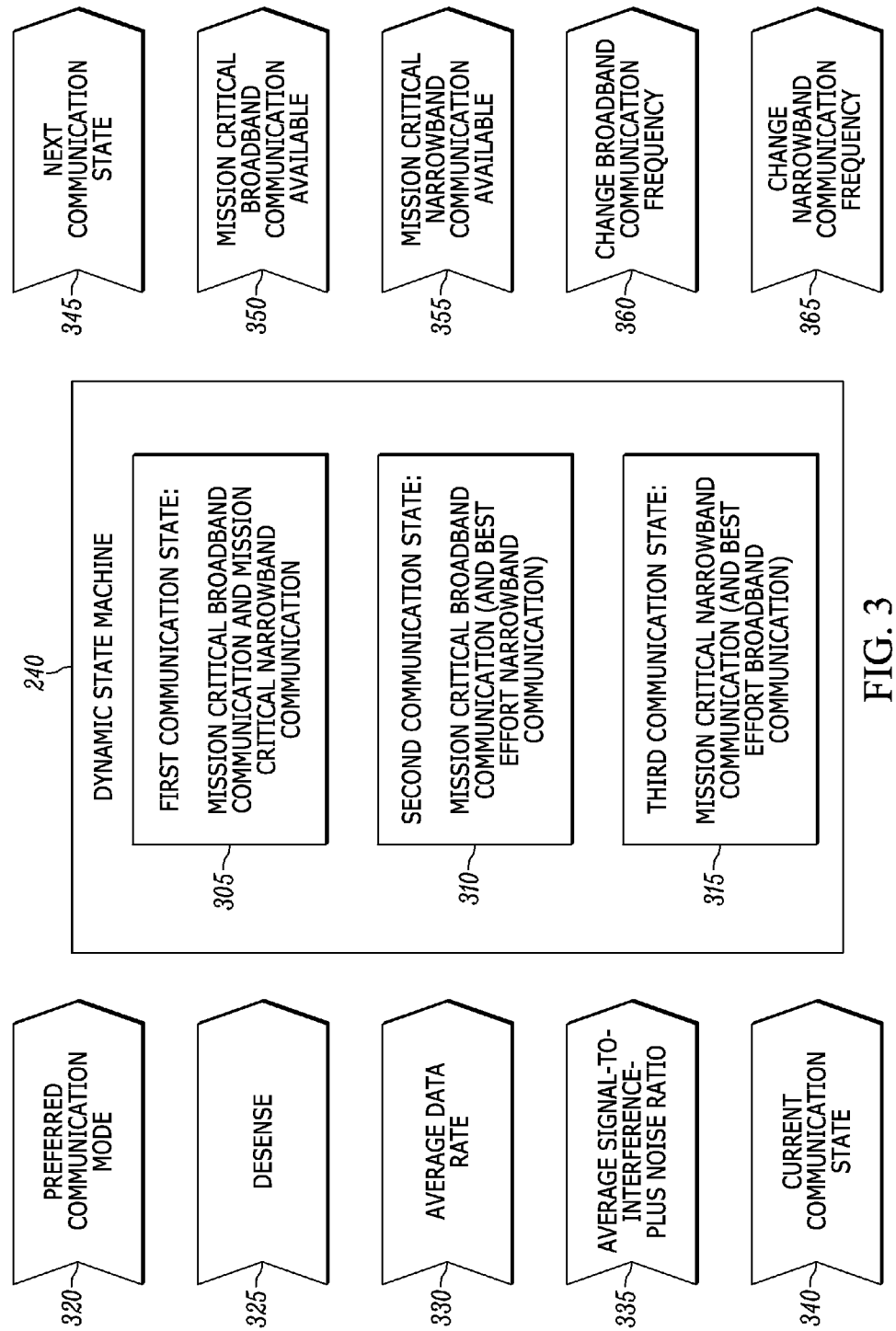
FIG. 3 is a block diagram of a dynamic state machine, in accordance with some embodiments.

FIG. 3 illustrates an embodiment of the dynamic state machine 240. In the embodiment illustrated in FIG. 3, the dynamic state machine 240 includes, among other states, a first communication state 305, a second communication state 310, and, a third communication state 315. In the first communication state 305, the converged communication device 105 transmits and/or receives mission critical broadband communication and mission critical narrowband communication (for example, both the broadband communication links 120 and the narrowband communication links 130 have mission critical status). In the second communication state 310, the converged communication device 105 transmits and/or receives mission critical broadband communication (for example, the broadband communication links 120 have mission critical status). In some embodiments, the converged communication device 105 also transmits and/or receives best effort (for example, non-mission critical) narrowband communication in the second communication state 310. In some embodiments, the converged communication device 105 does not transmit and/or receive any narrowband communication (for example, mission critical and non-mission critical) in the second communication state 310. In the third communication state 315, the converged communication device 105 transmits and/or receives mission critical narrowband communication (for example, the narrowband communication links 130 has mission critical status). In some embodiments, the converged communication device 105 also transmits and/or receives best effort (for example, non-mission critical) broadband communication in the third communication state 315. In some embodiments, the converged communication device 105 does not transmit and/or receive any broadband communication (for example, mission critical and non-mission critical) in the third communication state 315.

The dynamic state machine 240 dynamically assigns the converged communication device 105 to one of the three communication states 305 through 315 based on a plurality of inputs. In the embodiment illustrated in FIG. 3, the plurality of inputs includes inputs 320 through 340. The first input 320 includes the preferred communication mode. As explained above, the preferred communication mode is assigned to either broadband communication or narrowband communication. The second input 325 includes desense of the preferred communication mode. For example, the second input 325 includes broadband desense when the preferred communication mode is broadband communication. Further, the second input 325 includes narrowband desense when the preferred communication mode is narrowband communication. The third input 330 includes the average data rate at the broadband transceiver 200. In some embodiments, the plurality of inputs includes separate upload and download data rates at the broadband transceiver 200. The fourth input 335 includes the average signal-to-interference-plus-noise ratio at the narrowband transceiver 205. The fifth input 340 includes the current communication state that the converged communication device 105 is assigned to.

The dynamic state machine 240 generates a plurality of outputs. In the embodiment illustrated in FIG. 3, the plurality of outputs includes outputs 345 through 365. The first output 345 includes the next communication state that the converged communication device 105 will be assigned to. The second output 350 indicates when mission critical broadband communication is available. The third output 355 indicates when mission critical narrowband communication is available. The fourth output 360 includes a trigger to change one or more frequencies of the broadband communication links 120. The fifth output 365 includes a trigger to change the frequency of the narrowband communication link 130.

Figure 4A:
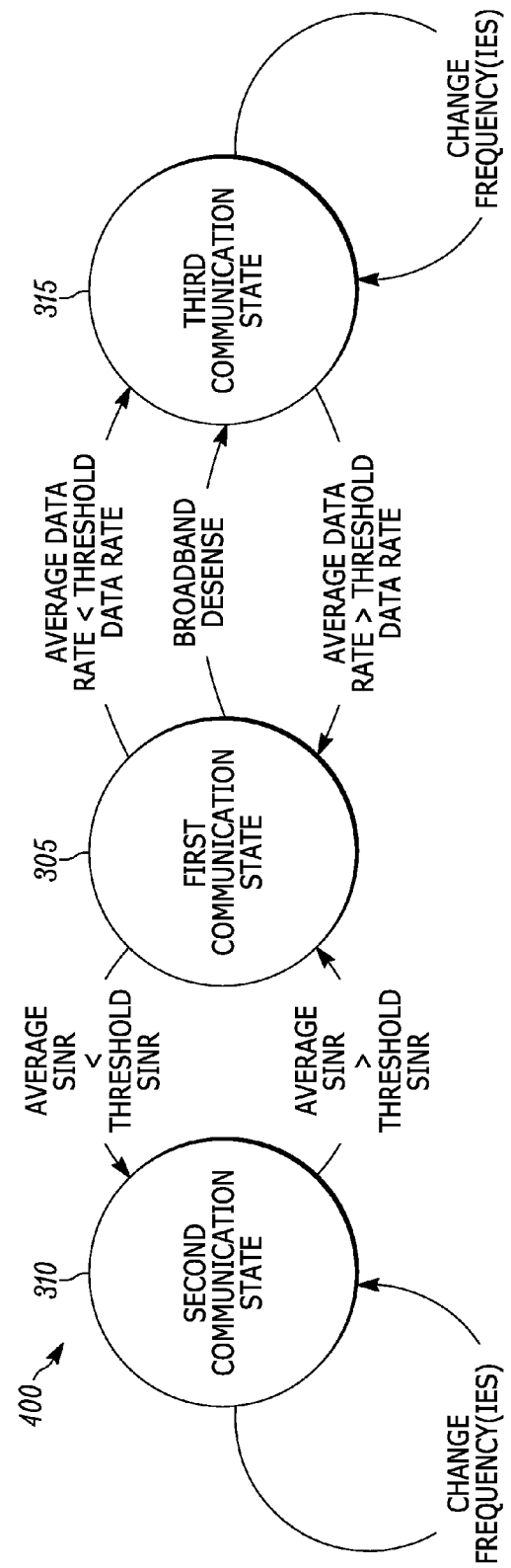
FIGS. 4A and 4B are state diagrams of a dynamic state machine, in accordance with some embodiments.
Figure 4B:
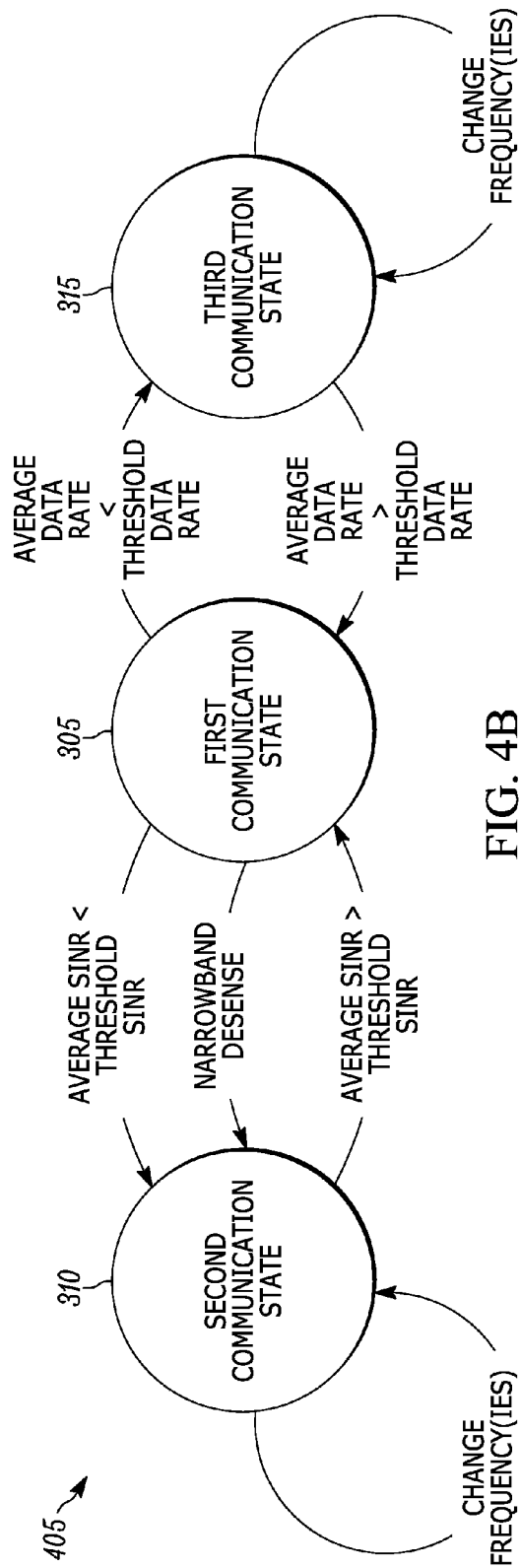

FIGS. 4A and 4B illustrate state diagrams 400 and 405 of the dynamic state machine 240 in the converged communication device 105 when the preferred communication mode is assigned to different types of communication (for example, broadband communication, narrowband communication).

FIG. 4A illustrates the state diagram 400 of the dynamic state machine 240 when the preferred communication mode is broadband communication. The converged communication device 105 is initially assigned to the first communication state 305. The converged communication device 105 changes from the first communication state 305 to the second communication state 310 when the average signal-to-interference-plus-noise ratio at the narrowband transceiver 205 falls below the threshold signal-to-interference-plus-noise ratio. The converged communication device 105 changes from the second communication state 310 to the first communication state 305 when the average signal-to-interference-plus-noise ratio at the narrowband transceiver 205 rises above the threshold signal-to-interference-plus-noise ratio.

In some embodiments, when the current communication state is the second communication state 310 and the preferred communication mode is broadband communication, the electronic processor 210 periodically performs corrective actions to increase the average signal-to-interference-plus-noise ratio at the narrowband transceiver 205. In some embodiments, the electronic processor 210 changes the frequency of the narrowband transceiver 205 to increase the average signal-to-interference-plus-noise ratio. In some embodiments, the electronic processor 210 changes the one or more frequencies used by the broadband transceiver 200 to increase the average signal-to-interference-plus-noise ratio. In some embodiments, the electronic processor 210 changes the frequency of the narrowband transceiver 205 and the one or more frequencies used by the broadband transceiver 200 to increase the average signal-to-interference-plus-noise ratio.

The converged communication device 105 changes from the first communication state 305 to the third communication state 315 when the average data rate at the broadband transceiver 200 falls below the threshold data rate. The converged communication device 105 also changes from the first communication state 305 to the third communication state 315 when broadband desense is detected (for example, by the desense detector 250). The converged communication device 105 changes from the third communication state 315 to the first communication state 305 when the average data rate at the broadband transceiver 200 rises above the threshold data rate.

The electronic processor 210 performs corrective actions to increase the average data rate at the broadband transceiver 200 when the current communication state is the third communication state 315 and the preferred communication mode is broadband communication. In some embodiments, the electronic processor 210 changes the one or more frequencies used by the broadband transceiver 200 to increase the average data rate. In some embodiments, the electronic processor 210 changes the frequency of the narrowband transceiver 205 to increase the average data rate. In some embodiments, the electronic processor 210 changes one or more frequencies used by the broadband transceiver 200 and the frequency of the narrowband transceiver 205 to increase the average data rate. In some embodiments, the electronic processor 210 stops transmitting narrowband communication from the narrowband transceiver 205 to increase the average data rate.

In alternate embodiments, when the current communication state is the first communication state 305 and the preferred communication mode is broadband communication, the electronic processor 210 periodically performs corrective actions (not shown) to increase the average data rate at the broadband transceiver 200. In some embodiments, the electronic processor 210 changes the one or more frequencies used by the broadband transceiver 200 to increase the average data rate. In some embodiments, the electronic processor 210 changes the frequency of the narrowband transceiver 205 to increase the average data rate. In some embodiments, the electronic processor 210 changes one or more frequencies used by the broadband transceiver 200 and the frequency of the narrowband transceiver 205 to increase the average data rate.

FIG. 4B illustrates the state diagram 405 of the dynamic state machine 240 when the preferred communication mode is the narrowband communication. The converged communication device 105 is initially assigned to the first communication state 305. The converged communication device 105 changes from the first communication state 305 to the second communication state 310 when the average signal-to-interference-plus-noise ratio at the narrowband transceiver 205 falls below the threshold signal-to-interference-plus-noise ratio. The converged communication device 105 also changes from the first communication state 305 to the second communication state 310 when narrowband desense is detected (for example, by the desense detector 250). The converged communication device 105 changes from the second communication state 310 to the first communication state 305 when the average signal-to-interference-plus-noise ratio at the narrowband transceiver 205 rises above the threshold signal-to-interference-plus-noise ratio.

The electronic processor 210 performs corrective actions to increase the average signal-to-interference-plus-noise ratio at the narrowband transceiver 205 when the current communication state is the second communication state 310 and the preferred communication mode is narrowband communication. In some embodiments, the electronic processor 210 changes the frequency of the narrowband transceiver 205 to increase the average signal-to-interference-plus-noise ratio. In some embodiments, the electronic processor 210 changes the one or more frequencies used by the broadband transceiver 200 to increase the average signal-to-interference-plus-noise ratio. In some embodiments, the electronic processor 210 changes the frequency of the narrowband transceiver 205 and the one or more frequencies used by the broadband transceiver 200 to increase the average signal-to-interference-plus-noise ratio. In some embodiments, the electronic processor 210 stops transmitting broadband communication from the broadband transceiver 200 to increase the average signal-to-interference-plus-noise ratio.

The converged communication device 105 changes from the first communication state 305 to the third communication state 315 when the average data rate at the broadband transceiver 200 falls below the threshold data rate. The converged communication device 105 changes from the third communication state 315 to the first communication state 305 when the average data rate at the broadband transceiver 200 rises above the threshold data rate.

In some embodiments, when the current communication state is the third communication state 315 and the preferred communication mode is narrowband communication, the electronic processor 210 periodically performs corrective actions to increase the average data rate at the broadband transceiver 200. In some embodiments, the electronic processor 210 changes the one or more frequencies used by the broadband transceiver 200 to increase the average data rate. In some embodiments, the electronic processor 210 changes the frequency of the narrowband transceiver 205 to increase the average data rate. In some embodiments, the electronic processor 210 changes one or more frequencies used by the broadband transceiver 200 and the frequency of the narrowband transceiver 205 to increase the average data rate.

In alternate embodiments, when the current communication state is the first communication state 305 and the preferred communication mode is narrowband communication, the electronic processor 210 periodically performs corrective actions (not shown) to increase the average signal-to-interference-plus-noise ratio at the narrowband transceiver 205. In some embodiments, the electronic processor 210 changes the frequency of the narrowband transceiver 205 to increase the average signal-to-interference-plus-noise ratio. In some embodiments, the electronic processor 210 changes the one or more frequencies used by the broadband transceiver 200 to increase the average signal-to-interference-plus-noise ratio. In some embodiments, the electronic processor 210 changes the frequency of the narrowband transceiver 205 and the one or more frequencies used by the broadband transceiver 200 to increase the average signal-to-interference-plus-noise ratio.

In alternate embodiments, the dynamic state machine 240 includes a fourth communication state (not shown). In the fourth communication state, the converged communication device 105 transmits and/or receives best effort (for example, non-mission critical) broadband communication. Also, in the fourth communication state, the converged communication device 105 transmits and/or receives best effort (for example, non-mission critical) narrowband communication. The converged communication device 105 is placed in the fourth communication state when the average data rate at the broadband transceiver 200 falls below the threshold data rate and the signal-to-interference-plus-noise ratio at the narrowband transceiver 205 falls below the threshold signal-to-interference-plus-noise ratio. In some embodiments, the converged communication device 105 is initially assigned to the fourth communication state.

In alternate embodiments, the dynamic state machine 240 includes more than two communication states in which the converged communication device 105 transmits and/or receives either mission critical broadband communication or mission critical narrowband communication. In some embodiments, the electronic processor 210 selects, based in part on a plurality of threshold signal-to-interference-plus-noise ratios, one of a plurality of communication states in which the converged communication device 105 only transmits and/or receives mission critical narrowband communication. In some embodiments, the electronic processor 210 selects and performs corrective actions to increase the average signal-to-interference-plus-noise ratio at the narrowband transceiver 205 based in part on the selected communication state of the plurality of communication states. In some embodiments, the electronic processor 210 selects, based in part on a plurality of threshold data rates, one of a plurality of communication states in which the converged communication device 105 only transmits and/or receives mission critical broadband communication. In some embodiments, the electronic processor 210 selects and performs corrective actions to increase the average data rate at the broadband transceiver 200 based in part on the selected communication state of the plurality of communication states.

Figure 5:
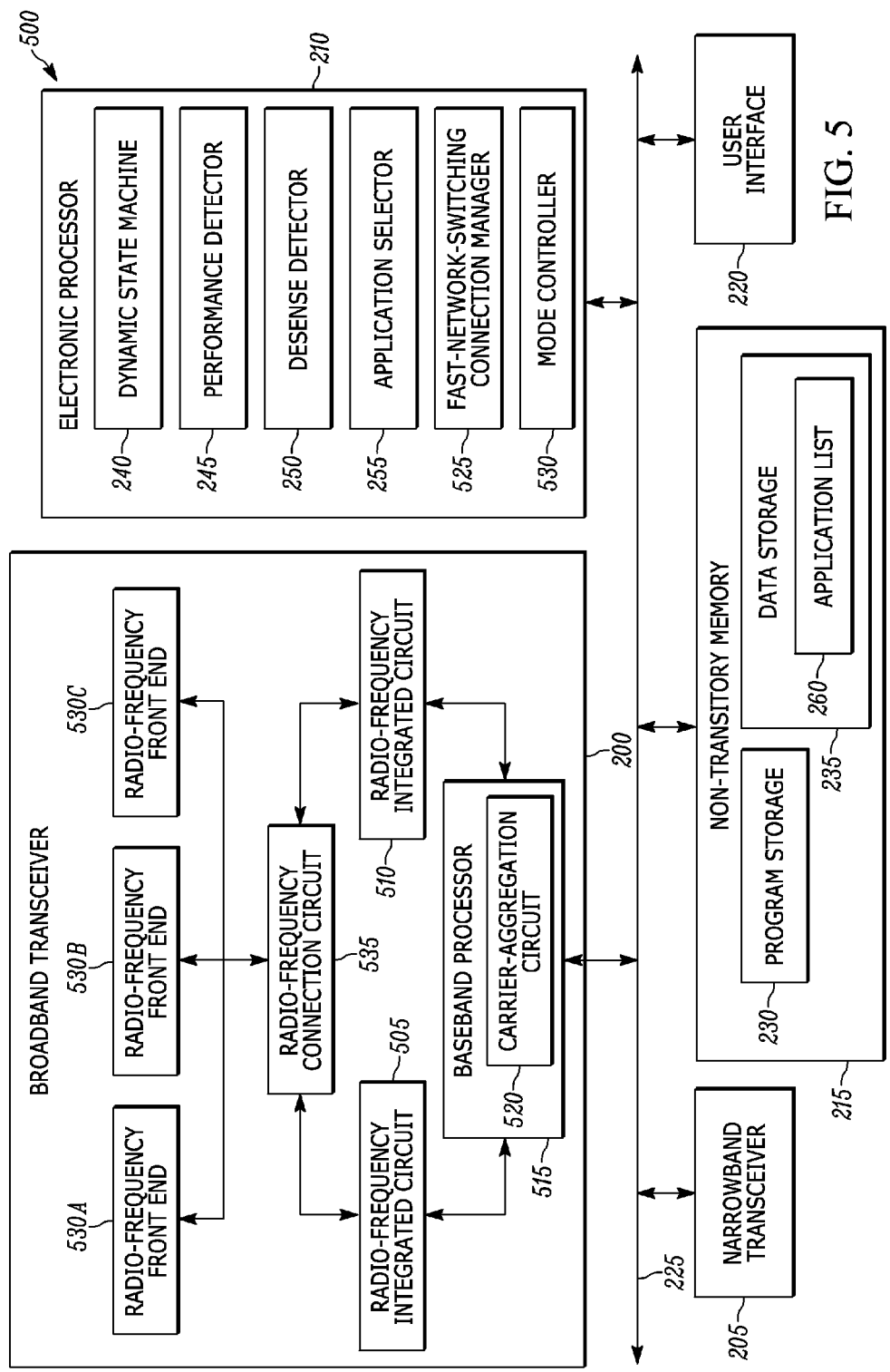
FIG. 5 is a block diagram of a converged communication device, in accordance with some embodiments.

FIG. 5 illustrates a converged communication device 500, in accordance with some embodiments. In particular, FIG. 5 depicts a converged communication device 500 as a further example of the converged communication device 105 of FIG. 2. In addition to the elements described with respect to the converged communication device 105 of FIG. 2, the converged communication device 500 includes, two radio-frequency integrated circuits 505 and 510, a baseband processor 515, a carrier-aggregation circuit 520, a fast-network-switching connection manager 525, a mode controller 530, a plurality of radio-frequency front ends 530A through 530C, and a radio-frequency connection circuit 535. The baseband processor 515 is coupled to radio-frequency integrated circuit 505 and radio-frequency integrated circuit 510. The baseband processor 515 is also coupled to the electronic processor 210, via the system bus 225. Each of the plurality of radio-frequency front ends 530A through 530C is configured for communication via a respective band and coupled to one or both of the radio-frequency integrated circuits 505 and 510. The plurality of radio-frequency front ends 530A through 530C are each coupled to one or both of the radio-frequency integrated circuits 505 and 510 via the radio-frequency connection circuit 535.

In some embodiments, the mode controller 530 selectively places the converged communication device 500 in a carrier-aggregation mode or in a fast-network-switching mode. In the carrier-aggregation mode, the converged communication device 500 conducts carrier-aggregation. In some embodiments, the converged communication device 500 conducts carrier-aggregation using at least the carrier-aggregation circuit 520 and radio-frequency integrated circuit 505. In some embodiments, the converged communication device 500 conducts carrier-aggregation using at least the carrier-aggregation circuit 520, radio-frequency integrated circuit 505, and radio-frequency integrated circuit 510. In some embodiments, the converged communication device 500 includes a single radio-frequency integrated circuit (for example, radio-frequency integrated circuit 505) supporting carrier-aggregation and coupled to two or more of the plurality of radio-frequency front ends 530A through 530C. In the fast-network-switching mode, the converged communication device 500 conducts fast network switching using the fast-network-switching connection manager 525 with respect to (i) broadband communication that is conducted via radio-frequency integrated circuit 505 and (ii) broadband communication that is conducted via radio-frequency integrated circuit 510. In some embodiments, the mode controller 530 iteratively places the converged communication device 500 in the carrier-aggregation mode or in the fast-network-switching mode based on the outputs from dynamic state machine 240.

In some embodiments, the fast-network-switching connection manager 525 receives a plurality of measurements (for example, a reference signal received power and a reference signal received quality). The plurality of measurements is taken by the radio-frequency integrated circuits 505 and 510, the baseband processor 515, and/or the plurality of radio-frequency front ends 530A through 530C. In some embodiments, the fast-network-switching connection manager 525 requests the plurality of measurements. In other embodiments, the fast-network-switching connection manager 525 receives the plurality of measurements periodically. In some embodiments, the fast-network-switching connection manager 525 carries out one or more hysteresis functions to stabilize mode switching behavior. The fast-network-switching connection manager 525 sends mode-switching and/or network-switching instructions to the mode controller 530 based on the plurality of measurements. In some embodiments, the fast-network-switching connection manager 525 assists the mode controller 530 by providing instructions and/or other information regarding fast-network switches, network transition events, and the like. In some embodiments, the fast-network-switching connection manager 525 sends mode-switching and/or network-switching instructions to the mode controller 530 based on the outputs from the dynamic state machine 240.

In some embodiments, the radio-frequency connection circuit 535 includes one or more physical radio-frequency switches. In some embodiments, the mode controller 530 sends a mode indicator to the radio-frequency connection circuit 535. The mode indicator indicates when the converged communication device 500 is in the fast-network-switching mode and in the carrier-aggregation mode. In some embodiments, the radio-frequency connection circuit 535 routes data based at least in part on the mode indicator. In some embodiments, the radio-frequency connection circuit 535 includes hardware for converting a radio frequency signal into a baseband signal. In some embodiments, the radio-frequency connection circuit 535 includes hardware for converting a baseband signal into a radio frequency signal.

Figure 6A:
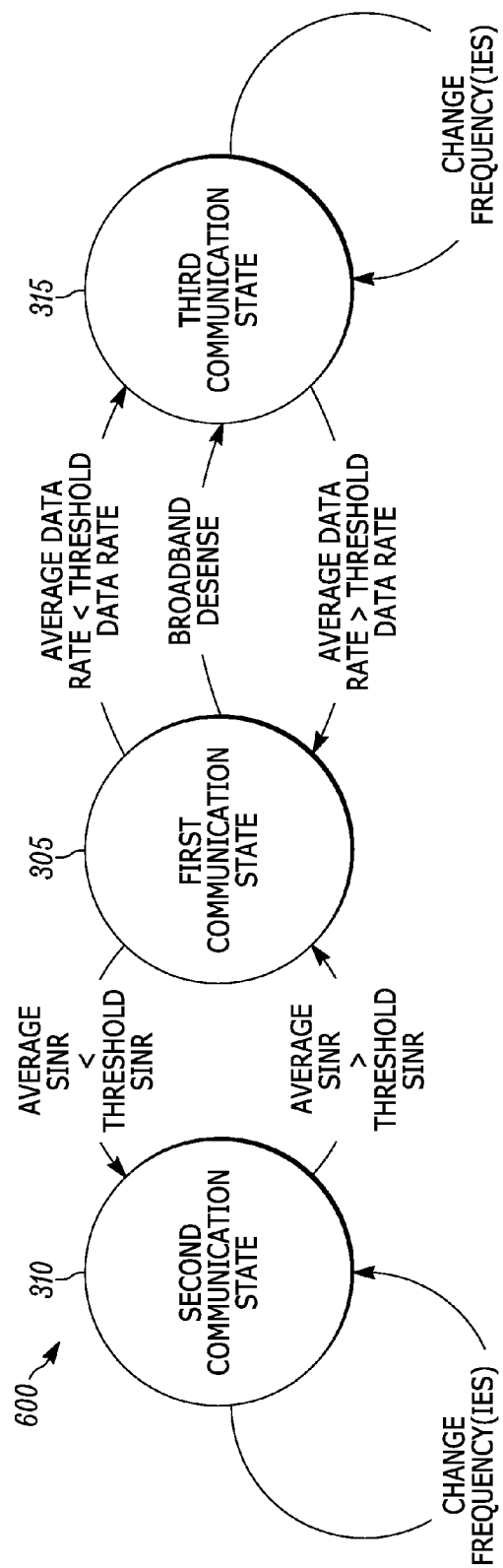
FIGS. 6A and 6B are state diagrams of a dynamic state machine, in accordance with some embodiments.
Figure 6B:
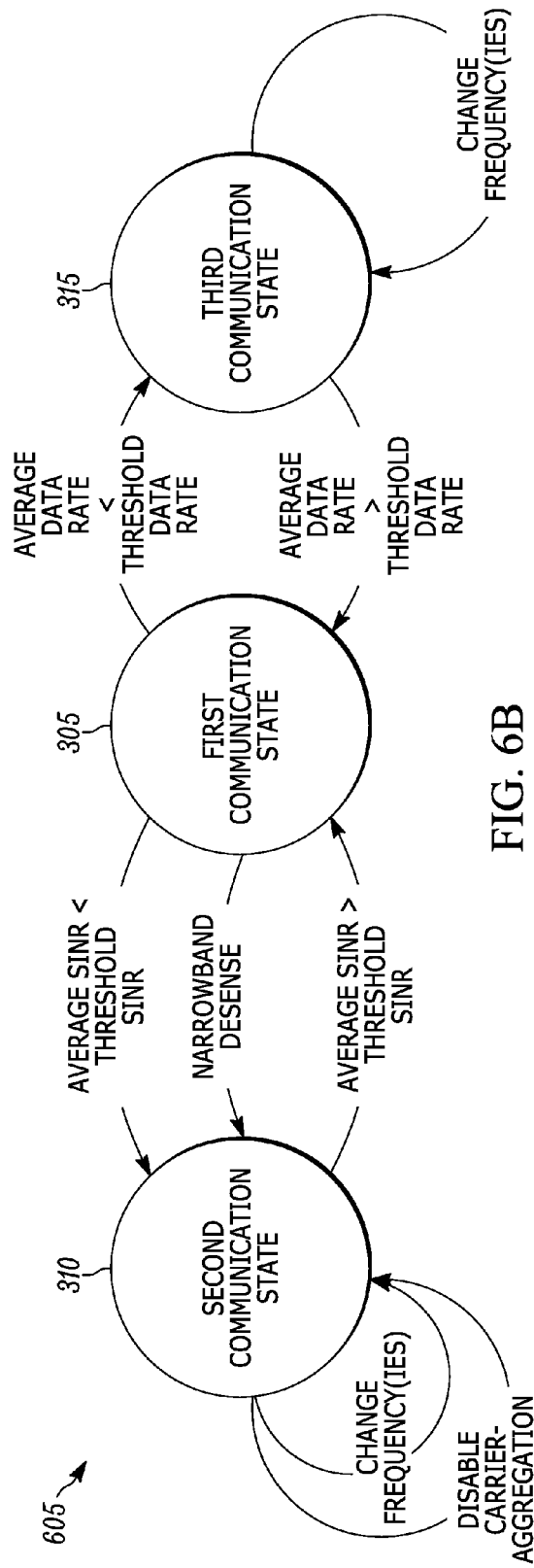

FIGS. 6A and 6B illustrate state diagrams 600 and 605 of the dynamic state machine 240 in the converged communication device 500 when the preferred communication mode is assigned to different types of communication (for example, broadband communication, narrowband communication).

FIG. 6A illustrates the state diagram 600 of the dynamic state machine 240 when the preferred communication mode is broadband communication. The converged communication device 500 is initially assigned to the first communication state 305. The converged communication device 500 changes from the first communication state 305 to the second communication state 310 when the average signal-to-interference-plus-noise ratio at the narrowband transceiver 205 falls below the threshold signal-to-interference-plus-noise ratio. The converged communication device 500 changes from the second communication state 310 to the first communication state 305 when the average signal-to-interference-plus-noise ratio at the narrowband transceiver 205 rises above the threshold signal-to-interference-plus-noise ratio.

In some embodiments, when the current communication state is the second communication state 310 and the preferred communication mode is broadband communication, the electronic processor 210 periodically performs corrective actions to increase the average signal-to-interference-plus-noise ratio at the narrowband transceiver 205. In some embodiments, the electronic processor 210 changes the frequency of the narrowband transceiver 205 to increase the average signal-to-interference-plus-noise ratio. In some embodiments, the electronic processor 210 changes the one or more frequencies (for example, a carrier-aggregation band combination and/or a fast-network-switching band combination) used by the broadband transceiver 200 to increase the average signal-to-interference-plus-noise ratio. In some embodiments, the electronic processor 210 changes the frequency of the narrowband transceiver 205 and the one or more frequencies used by the broadband transceiver 200 to increase the average signal-to-interference-plus-noise ratio.

The converged communication device 500 changes from the first communication state 305 to the third communication state 315 when the average data rate at the broadband transceiver 200 falls below the threshold data rate. The converged communication device 500 also changes from the first communication state 305 to the third communication state 315 when broadband desense is detected (for example, by the desense detector 250). The converged communication device 500 changes from the third communication state 315 to the first communication state 305 when average data rate at the broadband transceiver 200 rises above the threshold data rate.

When the converged communication device 500 is in the third communication state 315 and the preferred communication mode is broadband communication, the electronic processor 210 performs corrective actions to increase the average data rate at the broadband transceiver 200. In some embodiments, the electronic processor 210 changes the one or more frequencies (for example, a carrier-aggregation band combination and/or a fast-network-switching band combination) used by the broadband transceiver 200 to increase the average data rate. In some embodiments, the electronic processor 210 changes the frequency of the narrowband transceiver 205 to increase the average data rate. In some embodiment, the electronic processor 210 stops transmitting narrowband communication from the narrowband transceiver 205 to increase the average data rate.

In alternate embodiments, when the current communication state is the first communication state 305 and the preferred communication mode is broadband communication, the electronic processor 210 periodically performs corrective actions (not shown) to increase the average data rate at the broadband transceiver 200. In some embodiments, the electronic processor 210 changes the one or more frequencies (for example, a carrier-aggregation band combination and/or a fast-network-switching band combination) used by the broadband transceiver 200 to increase the average data rate. In some embodiments, the electronic processor 210 changes the frequency of the narrowband transceiver 205 to increase the average data rate. In some embodiments, the electronic processor 210 changes one or more frequencies used by the broadband transceiver 200 and the frequency of the narrowband transceiver 205 to increase the average data rate.

FIG. 6B illustrates the state diagram 605 of the dynamic state machine 240 when the preferred communication mode is the narrowband communication. The converged communication device 500 is initially assigned to the first communication state 305. The converged communication device 500 changes from the first communication state 305 to the second communication state 310 when the average signal-to-interference-plus-noise ratio at the narrowband transceiver 205 falls below the threshold signal-to-interference-plus-noise ratio. The converged communication device 500 also changes from the first communication state 305 to the second communication state 310 when narrowband desense is detected (for example, by the desense detector 250). The converged communication device 500 changes from the second communication state 310 to the first communication state 305 when the average signal-to-interference-plus-noise ratio at the narrowband transceiver 205 rises above the threshold signal-to-interference-plus-noise ratio.

The electronic processor 210 performs corrective actions to increase the average signal-to-interference-plus-noise ratio at the narrowband transceiver 205 when the converged communication device 500 is in the second communication state 310 and the preferred communication mode is narrowband communication. In some embodiments, the electronic processor 210 changes the frequency of the narrowband transceiver 205 to increase the average signal-to-interference-plus-noise ratio. In some embodiments, the electronic processor 210 changes the one or more frequencies (for example, a carrier-aggregation band combination and/or a fast-network-switching band combination) used by the broadband transceiver 200 to increase average signal-to-interference-plus-noise ratio. In some embodiments, the electronic processor 210 disables carrier-aggregation (for example, using the mode controller 530) to increase the average signal-to-interference-plus-noise ratio. In some embodiments, the electronic processor 210 disables carrier-aggregation between existing band combinations and enables carrier-aggregation between other available band combinations or, fast-network-switching between available band combinations to increase the average signal-to-interference-plus noise ratio. In some embodiments, the electronic processor 210 stops transmitting broadband communication from the broadband transceiver 200 to increase the average signal-to-interference-plus-noise ratio.

The converged communication device 500 changes from the first communication state 305 to the third communication state 315 when the average data rate at the broadband transceiver 200 falls below the threshold data rate. The converged communication device 500 changes from the third communication state 315 to the first communication state 305 when the average data rate at the broadband transceiver 200 rises above the threshold data rate.

In some embodiments, when the current communication state is the third communication state 315 and the preferred communication mode is narrowband communication, the electronic processor 210 periodically performs corrective actions to increase the average data rate at the broadband transceiver 200. In some embodiments, the electronic processor 210 changes the one or more frequencies (for example, a carrier-aggregation band combination and/or a fast-network-switching band combination) used by the broadband transceiver 200 to increase the average data rate. In some embodiments, the electronic processor 210 changes the frequency of the narrowband transceiver 205 to increase the average data rate. In some embodiments, the electronic processor 210 changes one or more frequencies used by the broadband transceiver 200 and the frequency of the narrowband transceiver 205 to increase the average data rate.

In alternate embodiments, when the current communication state is the first communication state 305 and the preferred communication mode is narrowband communication, the electronic processor 210 periodically performs corrective actions (not shown) to increase the average signal-to-interference-plus-noise ratio at the narrowband transceiver 205. In some embodiments, the electronic processor 210 changes the frequency of the narrowband transceiver 205 to increase the average signal-to-interference-plus-noise ratio. In some embodiments, the electronic processor 210 changes the one or more frequencies (for example, a carrier-aggregation band combination and/or a fast-network-switching band combination) used by the broadband transceiver 200 to increase the average signal-to-interference-plus-noise ratio. In some embodiments, the electronic processor 210 changes the frequency of the narrowband transceiver 205 and the one or more frequencies used by the broadband transceiver 200 to increase the average signal-to-interference-plus-noise ratio.

Figure 7:
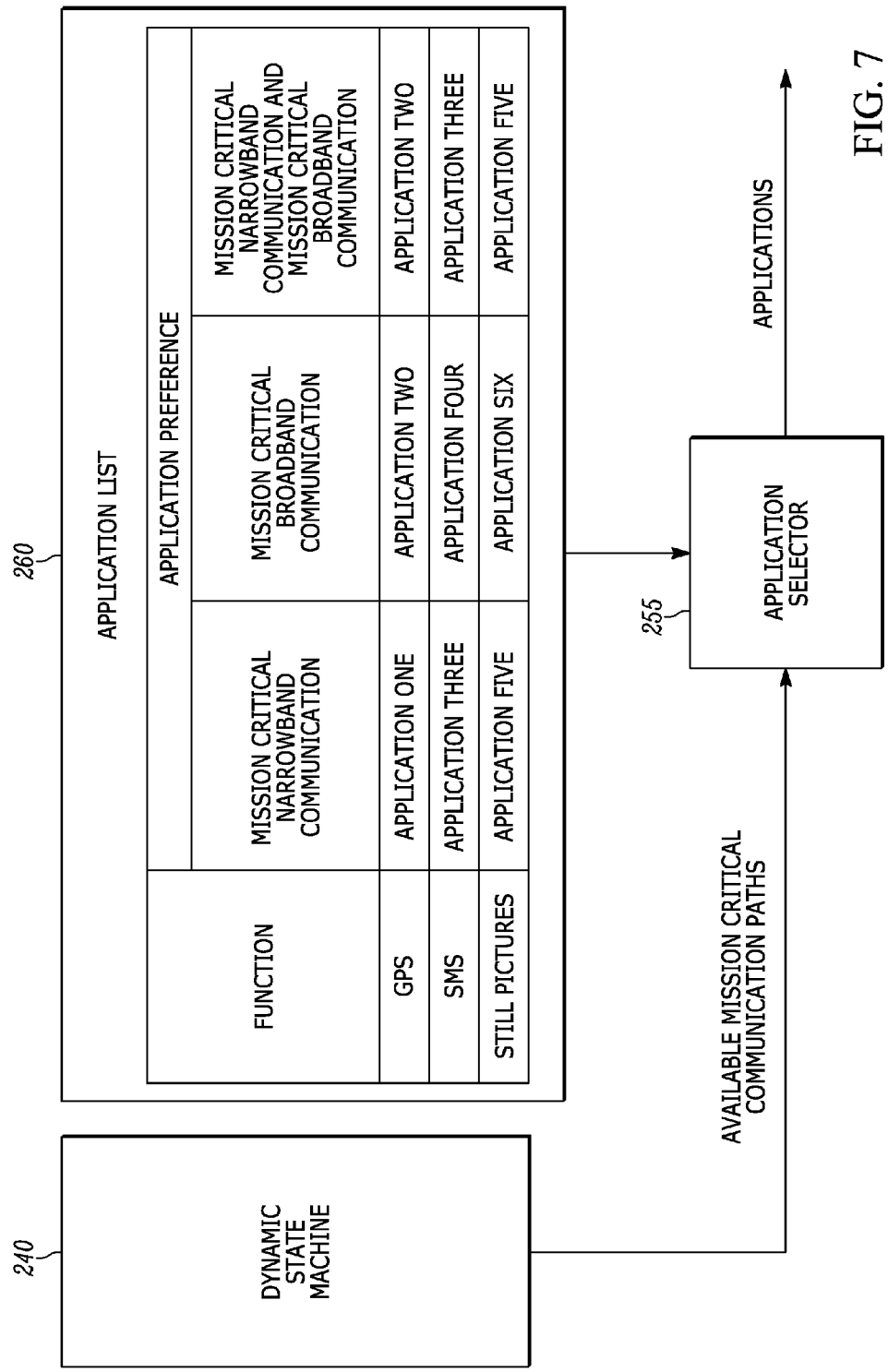
FIG. 7 is a block diagram of a dynamic state machine, an application list, and an application selector, in accordance with some embodiments.

FIG. 7 illustrates the dynamic state machine 240, the application selector 255, and the application list 260, according to some embodiments. The application selector 255 receives the available mission critical communication paths from the dynamic state machine 240. The converged communication device 105 is configured to perform a plurality of functions (for example, GPS, SMS, Still Pictures, etc.). The application list 260 includes a plurality of applications (for example, Application One, Application Two, Application Three, etc.). A single function can be executed using one application selected from a plurality of applications that are available and preferable in respective communication paths. For example, the GPS function can be executed using either Application One or Application Two. Each communication path prefers certain applications in order to execute a function. For each function, application preferences indicate a preference for which application should be executed based at least in part on the current available mission critical communication paths. In some embodiments, the application selector 255 selects which application to execute based on the application preferences. For example, the application selector 255 selects to execute (1) Application One when only mission critical narrowband communication is available, (2) Application Two when only mission critical broadband communication is available, and (3) Application Two when both mission critical broadband communication and mission critical narrow communication are available.

In some embodiments, a running application terminates when its preferred mission critical communication path is no longer available. In other embodiments, a running application continues to run when its preferred mission critical communication path is no longer available. In some embodiments, each application includes a preferred response behavior. The preferred response behavior dictates the behavior of each application when its preferred mission critical communication path is no longer available. In some embodiments, the response behavior for a running application, when its preferred mission critical communication path is no longer available, is determined based on its preferred response behavior.

Figure 8:
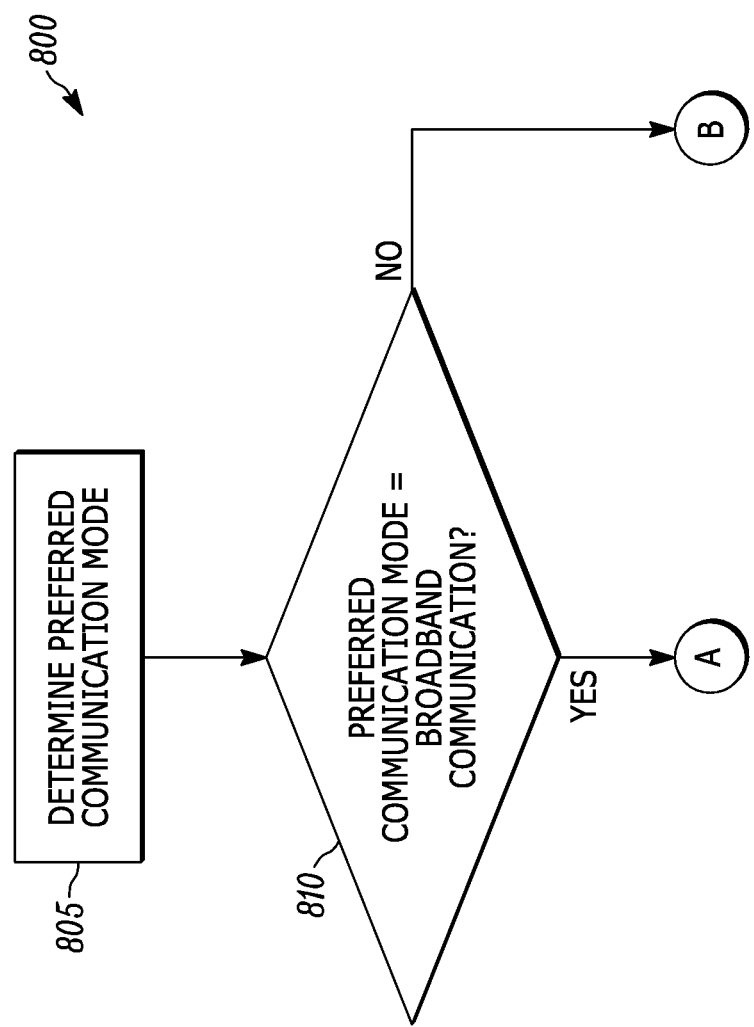
FIGS. 8 through 10 are a flowchart of providing broadband communication and narrowband communication in a converged communication device, in accordance with some embodiments.
Figure 9:
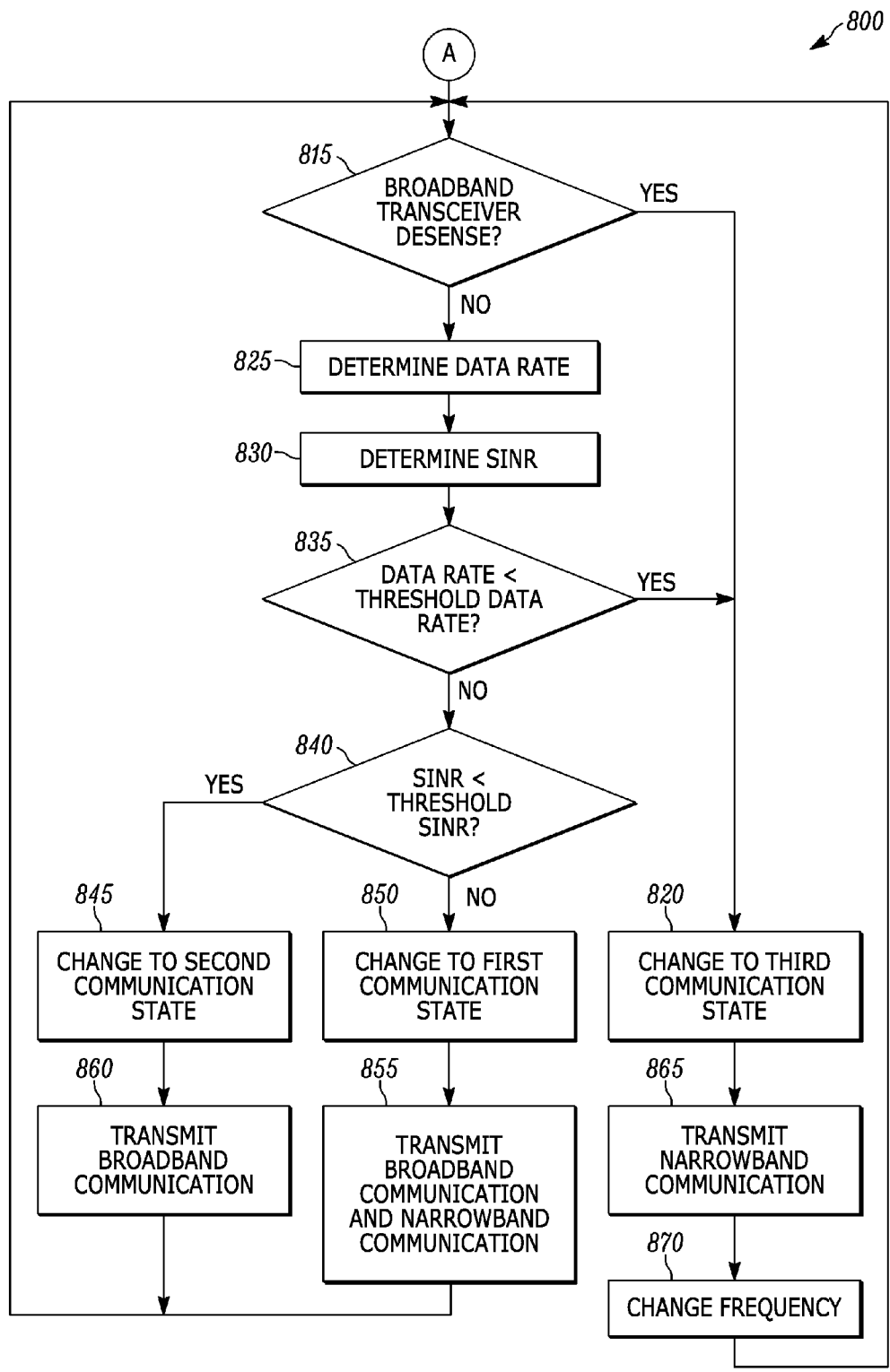
Figure 10:
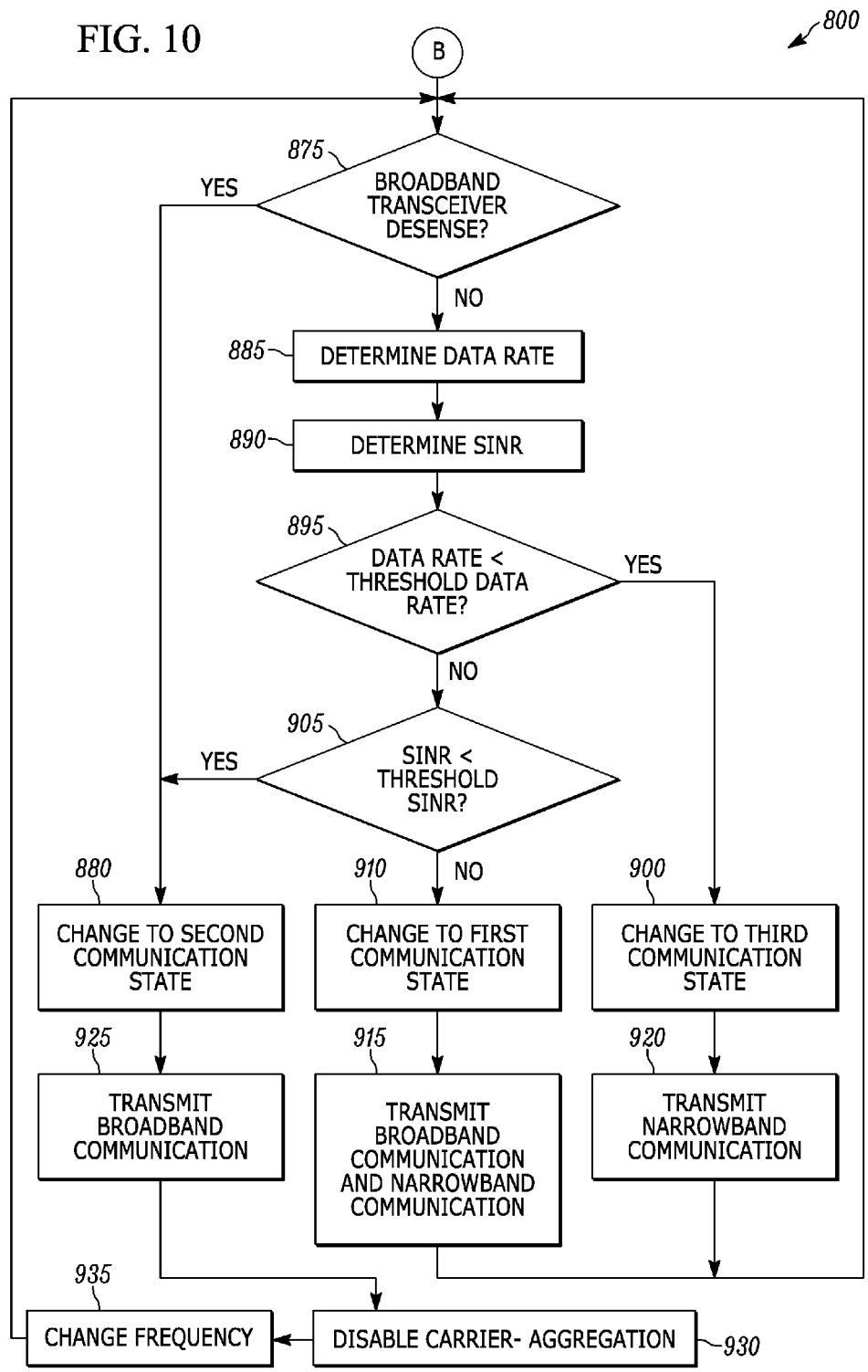

FIGS. 8 through 10 illustrate a method 800 (or process) of providing broadband communication and narrowband communication with a converged communication device (for example, converged communication device 500). In block 805, the electronic processor 210 determines a preferred communication mode. In the some embodiments, the electronic processor 210 determines a preferred communication mode by assigning a preference to either broadband communication or narrowband communication. In block 810, the electronic processor 210 determines when the preferred communication mode is broadband communication. The method 800 continues in section A when the preferred communication mode is broadband communication. Section A of the method 800 is shown and described below with respect to FIG. 9. Alternatively, the method 800 continues in section B when the preferred communication mode is not broadband communication (for example, the preferred communication mode is narrowband communication). Section B of the method 800 is shown and described below with respect to FIG. 10.

With respect to Section A of the method 800 and FIG. 9, in block 815, the electronic processor 210 determines when desense of the broadband transceiver 200 is detected (for example, by the desense detector 250). The electronic processor 210 changes the converged communication device 500 to the third communication state 315 (for example, from the first communication state 305) when desense of the broadband transceiver 200 is detected (block 820). Alternatively, the electronic processor 210 determines a data rate at the broadband transceiver 200 (for example, using the performance detector 245) when desense of the broadband transceiver 200 is not detected (block 825). In block 830, the electronic processor 210 determines a signal-to-interference-plus-noise ratio for the narrowband transceiver 205 (for example, using the performance detector 245). In block 835, the electronic processor 210 determines when the data rate at the broadband transceiver 200 is less than a threshold data rate. The electronic processor 210 changes the converged communication device 500 to the third communication state 315 (for example, from the first communication state 305) when the data rate at the broadband transceiver 200 is less than the threshold data rate (block 820). Alternatively, the method 800 proceeds to block 840 when the data rate at the broadband transceiver 200 is greater than the threshold data rate. In block 840, the electronic processor 210 determines when the signal-to-interference-plus-noise ratio at the narrowband transceiver 205 is less than a threshold signal-to-interference-plus-noise ratio. The electronic processor 210 changes the converged communication device 500 to the second communication state 310 (for example, from the first communication state 305) when the signal-to-interference-plus-noise ratio at the narrowband transceiver 205 is less than the threshold signal-to-interference-plus-noise ratio (block 845). Alternatively, the electronic processor 210 changes the converged communication device 500 to the first communication state 305 (for example, from either the second communication state 310 or the third communication state 315) when the signal-to-interference-plus-noise ratio at the narrowband transceiver 205 is greater than the threshold signal-to-interference-plus-noise ratio (block 850). In block 855, the electronic processor 210 transmits both broadband communication from the broadband transceiver 200 and narrowband communication from the narrowband transceiver 205. In some embodiments, the method 800 returns to block 815 after block 855. In block 860, the electronic processor 210 transmits broadband communication from the broadband transceiver 200. In some embodiments, the method 800 returns to block 815 after block 860. In block 865, the electronic processor 210 transmits narrowband communication from the narrowband transceiver 205. In block 870, the electronic processor 210 changes a frequency of the broadband communication. In some embodiments, the method 800 returns to block 815 after block 870.

With respect to Section B of the method 800 and FIG. 10, in block 875, the electronic processor 210 determines when desense of the narrowband transceiver 205 is detected (for example, by the desense detector 250). The electronic processor 210 changes the converged communication device 500 to the second communication state 310 (for example, from the first communication state 305) when desense of the narrowband transceiver 205 is detected (block 880). Alternatively, the electronic processor 210 determines the data rate at the broadband transceiver 200 (for example, using the performance detector 245) when desense of the narrowband transceiver 205 is not detected (block 885). In block 890, the electronic processor 210 determines the signal-to-interference-plus-noise ratio at the narrowband transceiver 205 (for example, using the performance detector 245). In block 895, the electronic processor 210 determines when the data rate at the broadband transceiver 200 is less than a threshold data rate. The electronic processor 210 changes the converged communication device 500 to the third communication state 315 (for example, from the first communication state 305) when the data rate at the broadband transceiver 200 is less than the threshold data rate (block 900). Alternatively, the method 800 proceeds to block 905 when the data rate at the broadband transceiver 200 is greater than the threshold data rate. In block 905, the electronic processor 210 determines when the signal-to-interference-plus-noise ratio at the narrowband transceiver 205 is less than a threshold signal-to-interference-plus-noise ratio. The electronic processor 210 changes the converged communication device 500 to the second communication state 310 (for example, from the first communication state 305) when the signal-to-interference-plus-noise ratio at the narrowband transceiver 205 is less than the threshold signal-to-interference-plus-noise ratio (block 880). Alternatively, the electronic processor 210 changes the converged communication device 500 to the first communication state 305 (for example, from either the second communication state 310 or the third communication state 315) when the signal-to-interference-plus-noise ratio at the narrowband transceiver 205 is greater than the threshold signal-to-interference-plus-noise ratio (block 910). In block 915, the electronic processor 210 transmits both broadband communication from the broadband transceiver 200 and narrowband communication from the narrowband transceiver 205. In some embodiments, the method 800 returns to block 875 after block 915. In block 920, the electronic processor 210 transmits narrowband communication from the narrowband transceiver 205. In some embodiments, the method 800 returns to block 875 after block 920. In block 925, the electronic processor 210 transmits broadband communication from the broadband transceiver 200. In the embodiment illustrated in FIG. 10, the electronic processor 210 disables carrier-aggregation (block 930). In other embodiments, the method 800 proceeds directly to block 935 after block 925. In block 935, the electronic processor 210 changes a frequency of the broadband communication. In some embodiments, the method 800 returns to block 875 after block 935.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of providing broadband communication and narrowband communication with a converged communication device, the method comprising:
   determining a data rate at a broadband transceiver of the converged communication device;
   determining a signal-to-interference-plus-noise ratio at a narrowband transceiver of the converged communication device;
   assigning a first communication state to the converged communication device when the data rate is greater than a threshold data rate and the signal-to-interference-plus-noise ratio is greater than a threshold signal-to-interference-plus-noise ratio;
   transmitting, at the broadband transceiver, the broadband communication when the converged communication device is in the first communication state; and
   transmitting, at the narrowband transceiver, the narrowband communication when the converged communication device is in the first communication state.

2. The method of claim 1, further comprising:
   changing the converged communication device from the first communication state to a second communication state when the signal-to-interference-plus-noise ratio is less or equal to than the threshold signal-to-interference-plus-noise ratio and the data rate is greater than the threshold data rate;
   changing the converged communication device from the first communication state to a third communication state when the data rate is less than or equal to the threshold data rate and the signal-to-interference-plus-noise ratio is greater than the threshold signal-to-interference-plus-noise ratio;
   transmitting, at the broadband transceiver, the broadband communication when the converged communication device is in the second communication state; and
   transmitting, at the narrowband transceiver, the narrowband communication when the converged communication device is in the third communication state.

3. The method of claim 2, further comprising:
   changing the converged communication device from the second communication state to the first communication state when the data rate is greater than the threshold data rate and the signal-to-interference-plus-noise ratio is greater than the threshold signal-to-interference-plus-noise ratio; and
   changing the converged communication device from the third communication state to the first communication state when the data rate is greater than the threshold data rate and the signal-to-interference-plus-noise ratio is greater than the threshold signal-to-interference-plus-noise ratio.

4. The method of claim 2, further comprising:
   determining a preferred communication mode by assigning a preference to either the broadband communication or the narrowband communication.

5. The method of claim 4, further comprising:
   changing at least one frequency selected from a group including a frequency of the broadband communication and a frequency of the narrowband communication when the converged communication device is in the third communication state and the preferred communication mode is the broadband communication; and
   changing the at least one frequency when the converged communication device is in the second communication state and the preferred communication mode is the narrowband communication.

6. The method of claim 4, further comprising:
   disabling carrier-aggregation when the converged communication device is in the second communication state and the preferred communication mode is the narrowband communication.

7. The method of claim 4, further comprising:
   detecting broadband desense; and
   changing the converged communication device from the first communication state to the third communication state when the broadband desense is detected and the preferred communication mode is the broadband communication.

8. The method of claim 4, further comprising:
   detecting narrowband desense; and
   changing the converged communication device from the first communication state to the second communication state when the narrowband desense is detected and the preferred communication mode is the narrowband communication.

9. The method of claim 4, wherein assigning the preference to either the narrowband communication or the broadband communication to generate the preferred communication mode includes:
   receiving, via a user interface, a set of input data; and
   determining the preferred communication mode based at least in part on the set of input data.

10. The method of claim 2, further comprising:
    selecting at least one application from a plurality of applications based at least in part on a current communication state of the converged communication device.

11. A converged communication device for providing broadband communication and narrowband communication, the converged communication device comprising:
    a broadband transceiver that transmits the broadband communication when the converged communication device is in a first communication state;
    a narrowband transceiver that transmits the narrowband communication when the converged communication device is in the first communication state; and
    an electronic processor programmed to
      determine a data rate at the broadband transceiver,
      determine a signal-to-interference-plus-noise ratio at the narrowband transceiver, and
      assign the first communication state to the converged communication device when the data rate is greater than a threshold data rate and the signal-to-interference-plus-noise ratio is greater than a threshold signal-to-interference-plus-noise ratio.

12. The converged communication device of claim 11, wherein the electronic processor is further programmed to
    change the converged communication device from the first communication state to a second communication state when the signal-to-interference-plus-noise ratio is less than or equal to the threshold signal-to-interference-plus-noise ratio and the data rate is greater than the threshold data rate, and
    change the converged communication device from the first communication state to a third communication state when the data rate is less than or equal to the threshold data rate and the signal-to-interference-plus-noise ratio is greater than the threshold signal-to-interference-plus-noise ratio, wherein the broadband transceiver transmits the broadband communication when the converged communication device is in the second communication state, and
wherein the narrowband transceiver transmits the narrowband communication when the converged communication device is in the third communication state.

13. The converged communication device of claim 12, wherein the electronic processor is further programmed to
change the converged communication device from the second communication state to the first communication state when the data rate is greater than the threshold data rate and the signal-to-interference-plus-noise ratio is greater than the threshold signal-to-interference-plus-noise ratio, and
change the converged communication device from the third communication state to the first communication state when the data rate is greater than the threshold data rate and the signal-to-interference-plus-noise ratio is greater than the threshold signal-to-interference-plus-noise ratio.

14. The converged communication device of claim 12, wherein the electronic processor is further programmed to determine a preferred communication mode by assigning a preference to either the broadband communication or the narrowband communication.

15. The converged communication device of claim 14, wherein the electronic processor is further programmed to
change at least one frequency selected from a group including a frequency of the broadband communication and a frequency of the narrowband communication when the converged communication device is in the third communication state and the preferred communication mode is the broadband communication, and
change the at least one frequency when the converged communication device is in the second communication state and the preferred communication mode is the narrowband communication.

16. The converged communication device of claim 14, wherein the electronic processor is further programmed to disable carrier-aggregation when the converged communication device is in the second communication state and the preferred communication mode is the narrowband communication.

17. The converged communication device of claim 14, wherein the electronic processor is further programmed to
detect broadband desense, and
change the converged communication device from the first communication state to the third communication state when the broadband desense is detected and the preferred communication mode is the broadband communication.

18. The converged communication device of claim 14, wherein the electronic processor is further programmed to
detect narrowband desense, and
change the converged communication device from the first communication state to the second communication state when the narrowband desense is detected and the preferred communication mode is the narrowband communication.

19. The converged communication device of claim 14, wherein the electronic processor is further programmed to
receive a set of input data via a user interface, and
determine the preferred communication mode based at least in part on the set of input data.

20. The converged communication device of claim 12, wherein the electronic processor is further programmed to select at least one application from a plurality of applications based at least in part on a current communication state of the converged communication device.

* * * * *